Patented June 1, 1954

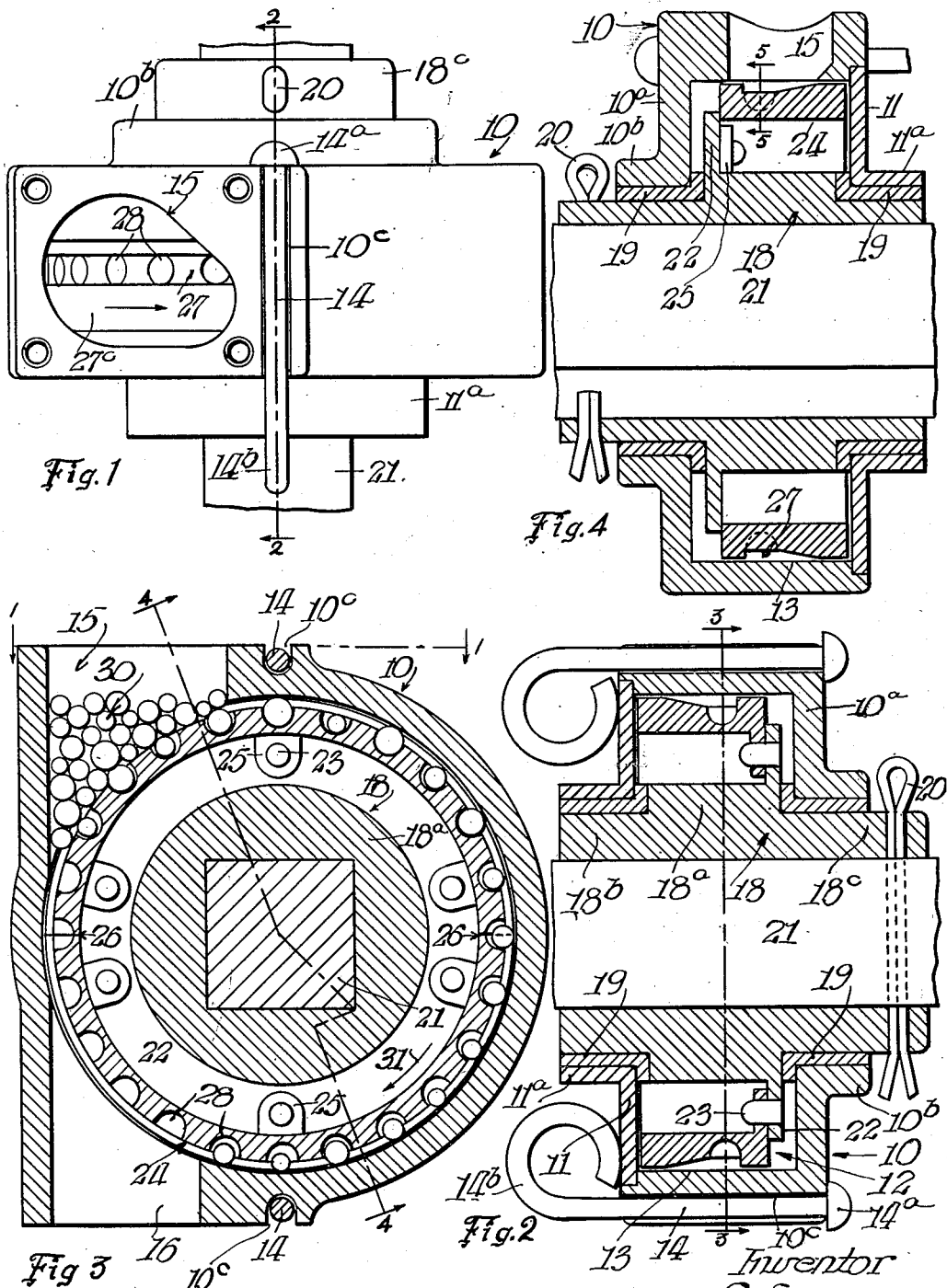

2,679,950

UNITED STATES PATENT OFFICE 2,679,950

SEED FEEDING MECHANISM

Swan G. Swanson, Rock, Mich.

Application April 4, 1951, Serial No. 219,298

10 Claims. (Cl. 222—9)

1

This invention relates to improvements in seed feeding mechanisms, for use in connection with hopper feed seed planters and it consists of the matters hereinafter described and more particularly pointed out in the appended claims.

One of the objects of the invention is to provide simple and efficient mechanism for feeding seed from a hopper, one at a time and without damage thereto or breakage thereof and for distributing the individual seeds in uniformly spaced relation along a row and this regardless of some difference in the size and the shape of the seed being planted.

Another object of the invention is to provide in a mechanism of this kind a novel seed feeding wheel structure and associated deflector or brush off arrangement and whereby even though the pick up portion of the wheel structure is engaged by a plurality of seed, only one of them is picked up at a time for spaced distribution in a planting operation.

A further object of the invention is to provide a mechanism of this kind, which affords a ready changing of the seed wheel, and whereby the mechanism may be used in planting many kinds of seed.

Also it is an object of the invention to provide a novel deflector or brush off structure which readily coacts without adjustment with such seed wheels as may be selected for a particular seed planting.

The above mentioned objects of the invention as well as others, along with the advantages thereof, will more fully appear as the specification proceeds.

In the drawings:

Fig. 1 is a top plan view of seed feeding mechanism, embodying one form of the invention, the plane of the view being indicated by the line 1—1 on Fig. 3 and parts being broken away to disclose the interior construction.

Fig. 2 is a longitudinal vertical sectional view of the mechanism appearing in Fig. 1, as taken on the line 2—2 thereof, the shaft being shown in elevation.

Fig. 3 is a transverse vertical sectional view through tthe improved mechanism as taken on the line 3—3 of Fig. 2.

Fig. 4 is another longitudinal and substantially vertical sectional view, as taken on the line 4—4 of Fig. 3, the shaft being shown in elevation.

2

Figure 5:
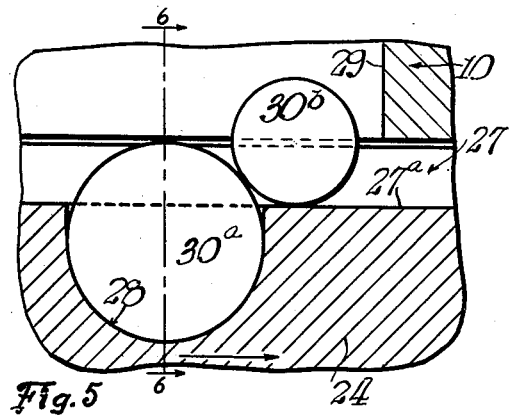
Fig. 5 is a fragmentary detail vertical sectional view, on an enlarged scale, through the seed pick up portion of the mechanism, as taken on the line 5—5 of Fig. 4.
Figure 6:
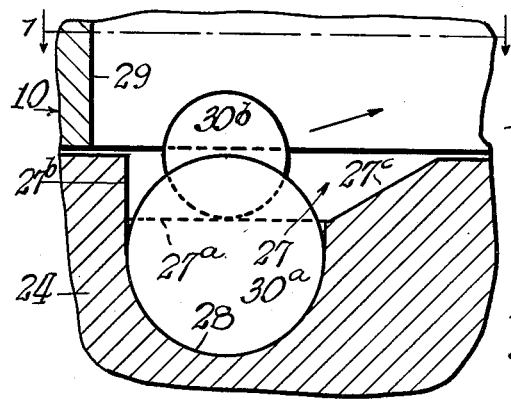

Fig. 6 is another fragmentary detail vertical sectional view as taken on the line 6—6 and on the scale of Fig. 5.

Figure 7:
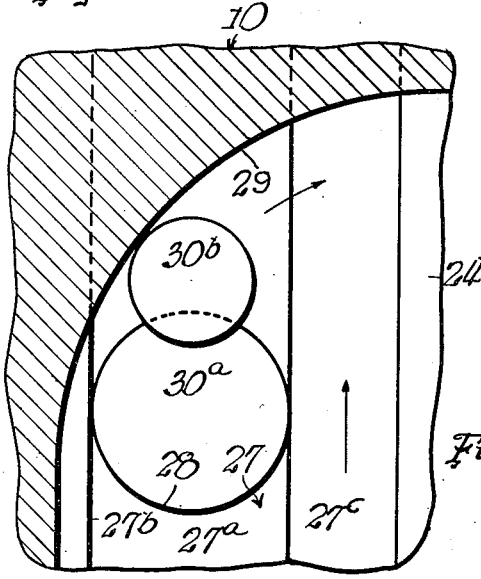

Fig. 7 is a fragmentary detail horizontal sectional view as taken on the line 7—7 and on the scale of Fig. 6.

Figure 8:
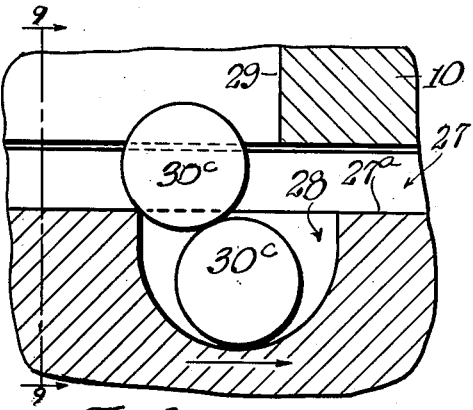

Fig. 8 is a view similar to Fig. 5 but showing the parts and action thereof in connection with seeds of a relative size, different from that appearing in said Fig. 5.

Figure 9:
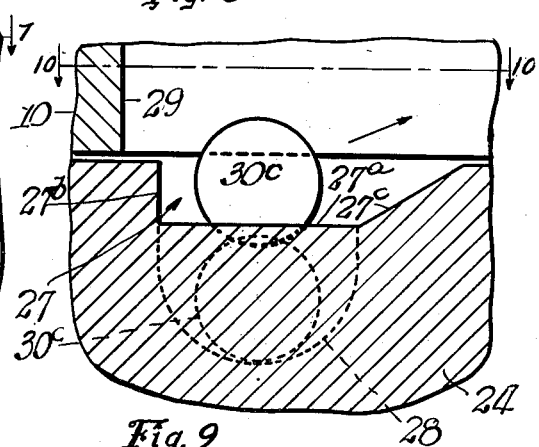

Fig. 9 is a view similar to Fig. 6 with the seeds shown therein as the same size as in Fig. 8.

Figure 10:
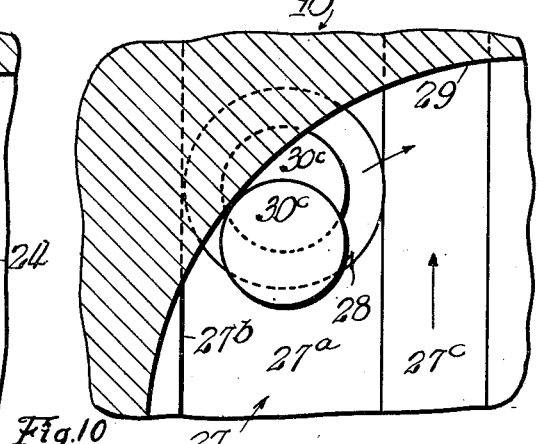

Fig. 10 is a view similar to Fig. 7 with the seeds shown therein as of the same size as in Figs. 8 and 9.

The improved seed feeding mechanism, as herein shown, may be conveniently attached to the bottom of the seed hopper of a seed planter and may be driven either by a tractor seed plate drive or by a shaft driven by the wheels of the planter.

Referring now in detail to that embodiment of the invention illustrated in the drawings 10 indicates as a whole the main housing of the mechanism which is open at one end and closed at the other end by an integral wall 10a that includes a bearing part 10b. The open end of the housing is closed by an end plate 11 which includes a bearing part 11a and this plate coacts with the housing to provide a chamber 12 in the housing, having an inner peripheral surface 13. The end plate is held tightly in weatherproof but removable engagement with the housing by means of a pair of stout spring clamps 14. The body of each clamp engages in a longitudinal groove 10c in the outer surface of the housing and is provided at one end with a head 14a to lock against parts of the integral end of the housing and is provided at the other end with an annulus 14b to bear against the end plate 11. The annulus of each clamp 14 provides a yielding finger grip for use in releasing the clamp so as to permit relatively longitudinal movement between the housing and said end plate.

The housing 10 is provided at one side of its axis with an upper seed inlet 15 and a lower seed outlet 16, both of which communicate with the chamber 12. The housing is adapted to be attached at the upper end of its seed inlet to a bottom portion of the seed hopper (not shown) of a planter and it is adapted to have attached to the lower end of its seed outlet some means (not shown) for conveying the seed to the planting soil. These openings are shown as arranged vertically in line with each other and tangential to the chamber in the housing, as best appears in Fig. 3. However, it is not necessary that such opening be in line with each other as they could be arranged somewhat out of line with each other and still function as intended.

18 indicates a collar associated with the housing. Its body 18a is disposed within the housing chamber 12 and its ends 18b—18c are journalled in the part 11a of the plate 11 and in the part 10b of the housing end wall by means of suitable bearing elements 19, as best appears in Fig. 2. The end 18c projects beyond the associated end of the housing and receives a removable pin 20 by which the collar is fixed to a driving shaft 21 preferably of a rectangular cross section.

On that end of the body associated with the end 18c is a radially extending flange 22 that carries inwardly extending studs 23 having rounded ends.

24 indicates the moving member or seed wheel of the mechanism, in the form of a ring composed of a plurality of parts or sections and each part is formed at one end with inwardly extending apertured ears 25 for driving engagement with the studs 23. As best shown in Fig. 3 this wheel is made in two semi-circular parts, the ends of which meet at 26 to constitute a complete ring, which rotates with the member 18.

The periphery of the seed wheel is disposed adjacent the inner periphery of the housing chamber 12 and in said periphery of the seed wheel is a circumferential groove 27. This groove is smaller in depth than the diameter of any seed it will handle and it is has a flat bottom 27a of a width that determines the largest size of seed it will handle. One side 27b of said groove is substantially radial and the other side 27c thereof extends upwardly and outwardly at an inclination from the associated side of the bottom to a point on the peripheral face of the wheel laterally of the groove, as best appears in Figs. 6 and 9.

In the periphery of the wheel, as defined by the bottom 27a of the groove 27, is a plurality of arcuately spaced rounded bottom pockets 28, each opening through said bottom of the groove. Each pocket is of a depth greater than that of the groove and is of a diameter approximating the width of the groove. In actual practice a depth for the pockets which is twice the depth of the groove has given good practical results.

Associated with that side of the seed inlet opening 15, which faces opposite the direction in which the seed wheel rotates, the housing carries a part that provides a seed brush off or deflecting surface 29, best appearing in Figs. 7 and 10. This surface which is substantially perpendicular to the associated portion of the periphery of the wheel, extends diagonally across the groove 27 and its inclined side 27c. Preferably this surface is a curved surface starting at a point spaced outwardly from the side 27b of the groove 27 and then sweeping forwardly and laterally in the direction of the rotation of the seed wheel to terminate outwardly on the other side from that portion of the inclined side of the groove that joins the periphery of the wheel as best appears in Figs. 9 and 10.

The groove mentioned has a number of purposes and one is to align certain seeds in the bottom of the seed inlet, with the pockets in the bottom of the groove. As shown, only one row of pockets is provided, but if desired more than one row could be employed. Also said groove permits only one seed at a time and no more to be carried by each pocket after it has passed the brush off or deflecting surface 29 and this in an undamaged or unbroken condition, regardless of a considerable difference in size in the seeds being planted. Also in the production of the wheel parts, the groove 27 may be made in different depths to accommodate the different sizes and shapes of seed it is desired to plant. In planting smooth and substantially spherical seed, such as rutabaga, radish and pea this clearance performs to the best advantage if it has a depth approximating about one-third the diameter of the largest of the seed to be planted.

Such a clearance will permit seed that differs in size as much as forty percent to properly pass through the mechanism from the seed inlet to the seed outlet without damage. For irregular shaped and sized seed such as for onion and beet, the clearance may remain the same, but the percentage of limit of difference in seed is somewhat less.

In Fig. 3 spherical seeds 30 of different diameters are shown located in the bottom of the seed inlet and supported by that portion of the periphery of the seed while in line with said inlet. It is to be noted that in each pocket, between the seed inlet and the seed outlet, considered in the direction of peripheral movement of the wheel, that there are different sizes of seed, one in each pocket. As each pocket approaches the horizontal plane of the axis about which the wheel rotates, portions of said seeds roll against the internal peripheral surface of the chamber in the housing and which surface prevents the escape of the seeds from the individual pocket until each successive seed reaches the seed outlet 17 when it will drop from the associated pocket to be discharged out of the same and planted in uniformly spaced relation along a planting row.

The direction of rotation of the seed wheel is indicated by the arrow 31 in Fig. 3 and in this rotation of the wheel, there is a relative movement of the seed at the bottom of the seed inlet and one of which will find its way into each pocket, and this regardless of the size of individual seed within the range for which the device is designed. Also some seed may ride the bottom of the groove 27 between seeds in adjacent pockets and as said some of said seed approaches the brush off or deflecting surface 29, said surface acts to deflect them laterally upwardly and outwardly of the groove side 27c to again mingle with the seed in the bottom of the seed inlet for a new pick-up by the seed wheel.

In Figs. 5, 6 and 7 I have illustrated a large sized seed 30a in a pocket and a smaller sized seed 30b in advance of said pocket and which smaller sized seed, as it approaches the surface 29 is deflected thereby, as before described.

In Figs. 8, 9 and 10 I have illustrated two relatively small seeds 30c—30c of substantially the same size and each smaller than the depth and diameter of the pocket. The upper seed is shown as partly in the pocket and engaged upon the trailing side of the seed in the pocket. When said upper seed reaches the brush off surface 29, it will be deflected thereby, as before described.

It is manifest that seed of various species if split in two halves, one half will retain the genesis of germination, the other half will lose it. Prior seed distributing mechanisms often split the seed and frequently deposited a number of inert halves in succession, and at other intervals, a number of dormant halves. The dormant halves of the seed, while they frequently germinate, produce a weaker plant than an undamaged seed, and it is, of course, obvious that nothing will develop from the inert halves of the seed. Such incidents, together with clogging and other mishaps caused by broken seed, has heretofore made it practically necessary to plant a liberal amount of seed and, after the plants are up, to employ costly labor to block and thin out the plants to a desired space in order to gain a satisfactory yield. It is also manifest, by experiments, that a more satisfactory yield can be obtained from vigorous seed properly spaced during planting.

From the foregoing, it is apparent that the improved mechanism has especial advantages in planting seeds, one at a time if that is desired, at uniformly spaced distances apart in a row in the planting soil and this without danger of damaging or breaking the seed. Thus, many of the objections inherent in devices heretofore designed for this purpose are overcome by the mechanism herein disclosed.

While in describing the invention I have referred in detail to the form, arrangement and construction of the parts thereof, the same is to be considered only in the illustrative sense and I do not, therefore, wish to be limited thereto except as may be specifically set forth in the appended claims.

I claim as my invention:

1. A seed planter construction embodying therein a housing having a seed inlet and a seed outlet, a member movable in one direction relative to said housing past said inlet and said outlet, said member having a continuous peripheral groove in one face thereof, of a depth less than the diameter of the seed that can be handled, seed pockets spaced longitudinally of said groove and opening through the bottom thereof and which pockets have a depth greater than that of said groove and communicate in succession with said seed inlet and said seed outlet in the movement of said member in said one direction, one side of said groove extending upwardly and outwardly from said bottom of said groove to said face laterally of said bottom and joining said side of said bottom with said face, and means carried by a part of said housing and crossing said groove adjacent said seed inlet and operating upon seeds in said groove between adjacent pockets for directing such seed upwardly and laterally of said one side of the groove to pass around the seed in a pocket approaching said means.

2. A seed planter construction embodying therein a housing having a seed inlet and a seed outlet, a member movable in one direction relative to said housing past said inlet and said outlet, said member having a continuous peripheral groove in one face thereof, of a depth less than the diameter of the seed that can be handled, seed pockets spaced longitudinally of said groove and opening through the bottom thereof and which pockets have a depth greater than that of said groove and communicate in succession with said seed inlet and said seed outlet in the movement of said member in said one direction, one side of said groove extending upwardly and outwardly from said bottom of said groove to said face laterally of said bottom and joining said side of said bottom with said face, and means carried by a part of said housing and providing a deflecting surface disposed diagonally of and crossing said groove adjacent said seed inlet and operating upon seed in said groove between adjacent pockets for directing such seed upwardly and laterally of said one side of the groove to pass around the seed in a pocket approaching said surface.

3. A seed planter construction embodying therein a housing having a seed inlet and a seed outlet, a member movable in one direction relative to said housing past said inlet and said outlet, said member having a continuous peripheral groove in one face thereof, of a depth less than the diameter of the seed that can be handled, seed pockets spaced longitudinally of said groove and opening through the bottom thereof and which pockets have a depth greater than that of said groove and communicate in succession with said seed inlet and said seed outlet in the movement of said member in said one direction, one side of said groove extending upwardly and outwardly from said bottom of said groove to said face laterally of said bottom and joining said side of said bottom with said face, and means carried by a part of said housing and providing a curved deflecting surface that crosses said groove adjacent said seed inlet and operating upon seed in said groove between adjacent pockets for directing such seed upwardly and laterally of said one side of the groove to pass around the seed in a pocket approaching said surface.

4. A seed planter construction embodying therein a substantially circular housing having a seed inlet and a seed outlet, means journalled in said housing and having a circular peripheral face, there being a continuous peripheral groove in said face which extends completely around the same and has a depth less than the diameter of the seed that can be handled, seed pockets spaced circumferentially about said face and each opening through the bottom of said groove and which pockets have a depth greater than that of said groove and which pockets communicate in succession with said seed inlet and said seed outlet respectively in the rotation of said means, one side of said groove extending upwardly and outwardly from said bottom of said groove to said face laterally of said bottom and joining said side of said bottom with said face, and means carried by a part of said housing and crossing said groove adjacent said seed inlet and operating upon seed in said groove between adjacent pockets for directing such seed upwardly and laterally of said one side of the groove to pass around the seed in the pocket approaching said means.

5. A seed planter construction embodying therein a housing having an annular chamber therein and a seed inlet and a seed outlet communicating with said chamber, said chamber being normally closed at one end and open at the other end, means providing a removable closure for the open end of said chamber, a member journalled in the closed end and in said removable closure for the other end of the chamber, a shaft extending axially through said member for driving the same, a seed distributing member comprising a plurality of parts adapted for lateral application to said journalled member and coacting stud and recess on said journalled member and on said parts of said seed distributing member affording a driving connection between said members and which parts of said seed distributing members are formed in their peripheral portions to coact with the inner peripheral portion of said chamber to carry seed from said seed inlet to said seed outlet.

6. A seed planter construction embodying therein a housing providing a chamber having an inner annular peripheral surface and a seed inlet and a seed outlet communicating with said chamber, means journalled in said housing and having outer annular peripheral surface opposing the first mentioned peripheral surface, said means having a continuous groove in its periphery, of a depth less than the diameter of the seed that can be handled seed pockets spaced longitudinally of said groove and opening through the bottom thereof and which pockets communicate with said seed inlet and said seed outlet in the rotation of said means in said chamber, each pocket having a depth greater than the depth of said groove, one side of said groove extending upwardly and outwardly from the bottom of said groove to the periphery of said means laterally of said bottom of the groove and joining said side of the bottom with said periphery, and means carried by a part of said housing adjacent the seed inlet and crossing said groove and operating upon seeds in said groove between adjacent pockets for directing such seed upwardly and laterally outward of said one side of the groove to pass around the seed in the pocket approaching said means.

7. In a seed planter, a seed wheel having a groove extending entirely around its periphery and having a bottom and two sides, one of said sides extending upwardly and outwardly from said bottom of said groove to said periphery, laterally of said bottom and joining the latter with said periphery, said groove having a depth less than the diameter of the seed that can be handled, and seed pockets arranged in spaced relation about and opening through the bottom of said groove and having a depth greater than that of said groove.

8. In a seed planter, a seed wheel having a groove extending entirely around its periphery and having a bottom and two sides, one of said sides extending upwardly and outwardly from said bottom of said groove to said periphery, laterally of said bottom and joining the latter with said periphery, said groove having a depth less than the diameter of the seed that can be handled, and seed pockets arranged in spaced relation about and opening through the bottom of said groove and having a depth greater than that of said groove and a diameter approximating the width of said bottom of the groove.

9. In a seed planter, a seed wheel having a groove extending entirely about its periphery and having a bottom and two sides, one of said sides extending upwardly and outwardly from said bottom of said groove to said periphery, laterally of said bottom and joining the latter with said periphery, said groove having a depth less than the diameter of the seed that can be handled, and seed pockets arranged in spaced relation about and opening through the bottom of said groove and having a depth approximately twice the depth of said groove.

10. In a seed planter, a seed wheel having a groove extending entirely about its periphery and having a bottom and two sides, one of said sides extending upwardly and outwardly from said bottom of said groove to said periphery, laterally of said bottom and joining the latter with said periphery, said groove having a depth less than the diameter of the seed that can be handled, and seed pockets arranged in spaced relation about and opening through the bottom of said groove and having a depth approximately twice the depth of said groove and a diameter approximating the width of said bottom of the groove.

References Cited in the file of this patent

UNITED STATES PATENTS

| Number | Name | Date |
|---|---|---|
| 837,542 | Bristow | Dec. 4, 1906 |
| 985,382 | Walter | Feb. 28, 1911 |
| 2,440,846 | Cannon | May 4, 1948 |
| 2,510,658 | Rassmann | June 6, 1950 |
| 2,548,245 | Stevens | Apr. 10, 1951 |
| 2,605,023 | Ward | July 29, 1952 |